(12) United States Patent
Koba

(10) Patent No.: US 7,774,704 B2
(45) Date of Patent: Aug. 10, 2010

(54) IMAGE PROCESSING APPARATUS

(75) Inventor: Toshinori Koba, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 1172 days.

(21) Appl. No.: 11/011,319

(22) Filed: Dec. 13, 2004

(65) Prior Publication Data
US 2005/0158028 A1 Jul. 21, 2005

(30) Foreign Application Priority Data
Jan. 6, 2004 (JP) .............................. 2004-000895

(51) Int. Cl.
G06F 3/00 (2006.01)
(52) U.S. Cl. ..................... 715/716; 715/719; 715/723
(58) Field of Classification Search ................. 715/716, 715/719, 723, 202; 707/102; 386/69
See application file for complete search history.

(56) References Cited

U.S. PATENT DOCUMENTS

| | | | | |
|---|---|---|---|---|
| 5,924,071 | A * | 7/1999 | Morgan et al. | 704/278 |
| 6,518,978 | B1 * | 2/2003 | Omata et al. | 715/723 |
| 6,571,054 | B1 * | 5/2003 | Tonomura et al. | 386/95 |
| 6,779,116 | B2 * | 8/2004 | Tagawa et al. | 713/193 |
| 6,990,497 | B2 * | 1/2006 | O'Rourke et al. | 707/101 |
| 6,993,532 | B1 * | 1/2006 | Platt et al. | 707/102 |
| 7,024,424 | B1 * | 4/2006 | Platt et al. | 707/102 |
| 7,149,961 | B2 * | 12/2006 | Harville et al. | 715/202 |
| 7,159,174 | B2 * | 1/2007 | Johnson et al. | 715/716 |
| 7,216,008 | B2 * | 5/2007 | Sakata | 700/94 |
| 7,363,314 | B2 * | 4/2008 | Picker et al. | 707/102 |
| 2002/0015495 | A1 * | 2/2002 | Kageyama et al. | 380/201 |
| 2002/0122154 | A1 * | 9/2002 | Morley et al. | 352/38 |
| 2002/0197058 | A1 * | 12/2002 | Suzuki et al. | 386/69 |
| 2003/0182255 | A1 * | 9/2003 | Plastina et al. | 707/1 |
| 2003/0182315 | A1 * | 9/2003 | Plastina et al. | 707/200 |
| 2003/0221541 | A1 * | 12/2003 | Platt | 84/609 |
| 2004/0047592 | A1 * | 3/2004 | Seo et al. | 386/46 |
| 2004/0078383 | A1 * | 4/2004 | Mercer et al. | 707/102 |
| 2004/0120694 | A1 * | 6/2004 | Hamada et al. | 386/95 |
| 2004/0170386 | A1 * | 9/2004 | Mikawa | 386/69 |
| 2004/0254956 | A1 * | 12/2004 | Volk | 707/104.1 |
| 2005/0147385 | A1 * | 7/2005 | Takahashi et al. | 386/69 |
| 2005/0246641 | A1 * | 11/2005 | Hori et al. | 715/723 |
| 2006/0110111 | A1 * | 5/2006 | Van Gestel et al. | 385/95 |
| 2007/0189727 | A1 * | 8/2007 | Hamada et al. | 386/96 |

FOREIGN PATENT DOCUMENTS

| JP | 2002-230906 A | 8/2002 |
|---|---|---|
| JP | 2003-45160 A | 2/2003 |

* cited by examiner

Primary Examiner—Tadeese Hailu
(74) Attorney, Agent, or Firm—Canon U.S.A., Inc. I.P. Division

(57) ABSTRACT

An image processing apparatus according to the present invention includes a playback unit for playing back image data and a plurality of pieces of playlist data from a recording medium, each of the plurality of pieces of playlist data representing a playback procedure of the image data; and a playlist processing unit for generating new playlist data in accordance with the plurality of pieces of playlist data recorded on the recording medium.

8 Claims, 5 Drawing Sheets

FIG. 4
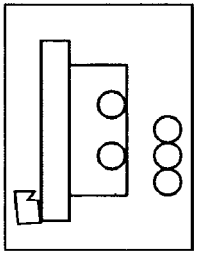
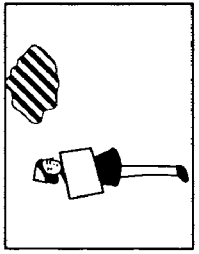
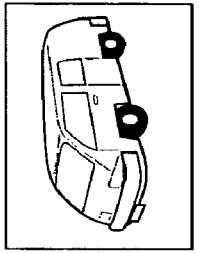
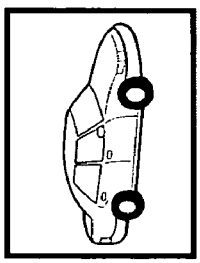
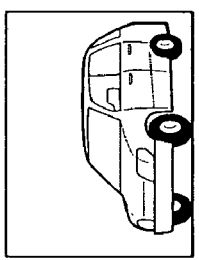
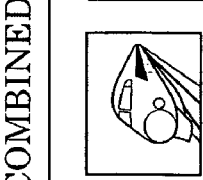
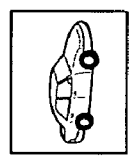
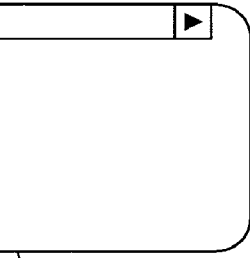

IMAGE PROCESSING APPARATUS

BACKGROUND OF THE INVENTION

1. Field of the Invention

The present invention relates to image processing apparatuses, and more particularly, to processing for a playlist representing a playback procedure of image data.

2. Description of the Related Art

A technology for generating a list (hereinafter, referred to as a playlist) representing a playback procedure, such as a playback order and playback time, of image data and sound data recorded on a recording medium and playing back the data in accordance with the playlist is disclosed, for example, in Japanese Patent Laid-Open No. 2002-354425.

Image recording/playback apparatuses capable of defining a plurality of playlists are available. Such image recording/playback apparatuses are capable of creating playlists subdivided in accordance with a purpose. Also, image recording/playback apparatuses having a function to automatically detect changes of scene when being photographed and to automatically create a playlist including scenes arranged sequentially are available.

However, although a playlist can be created in accordance with a purpose, a plurality of created playlists is merely played back in turn. For example, in order to exchange scenes among playlists, a user needs to perform a troublesome operation, such as creating a new playlist. In particular, creating a playlist including many files needs a difficult operation because it is difficult to retrieve and operate the files in the playlist.

SUMMARY OF THE INVENTION

The present invention is capable of readily creating a playlist for playing back images designated in a plurality of playlists by a desired playback procedure.

According to an aspect of the present invention, an image processing apparatus includes: a playback unit configured to play back image data and a plurality of pieces of playlist data from a recording medium, each of the plurality of pieces of playlist data representing a playback procedure of the image data; and a playlist processing unit configured to generate new playlist data in accordance with the plurality of pieces of playlist data recorded on the recording medium.

Further features and advantages of the present invention will become apparent from the following description of exemplary embodiments with reference to the attached drawings.

BRIEF DESCRIPTION OF THE DRAWINGS

FIG. 4 illustrates a playlist selection screen.

DESCRIPTION OF THE EMBODIMENTS

Embodiments of the present invention will be described with reference to the drawings.

First Embodiment

The schematic structure of an image recording/playback apparatus according to a first embodiment of the present invention will be described.

Figure 1:
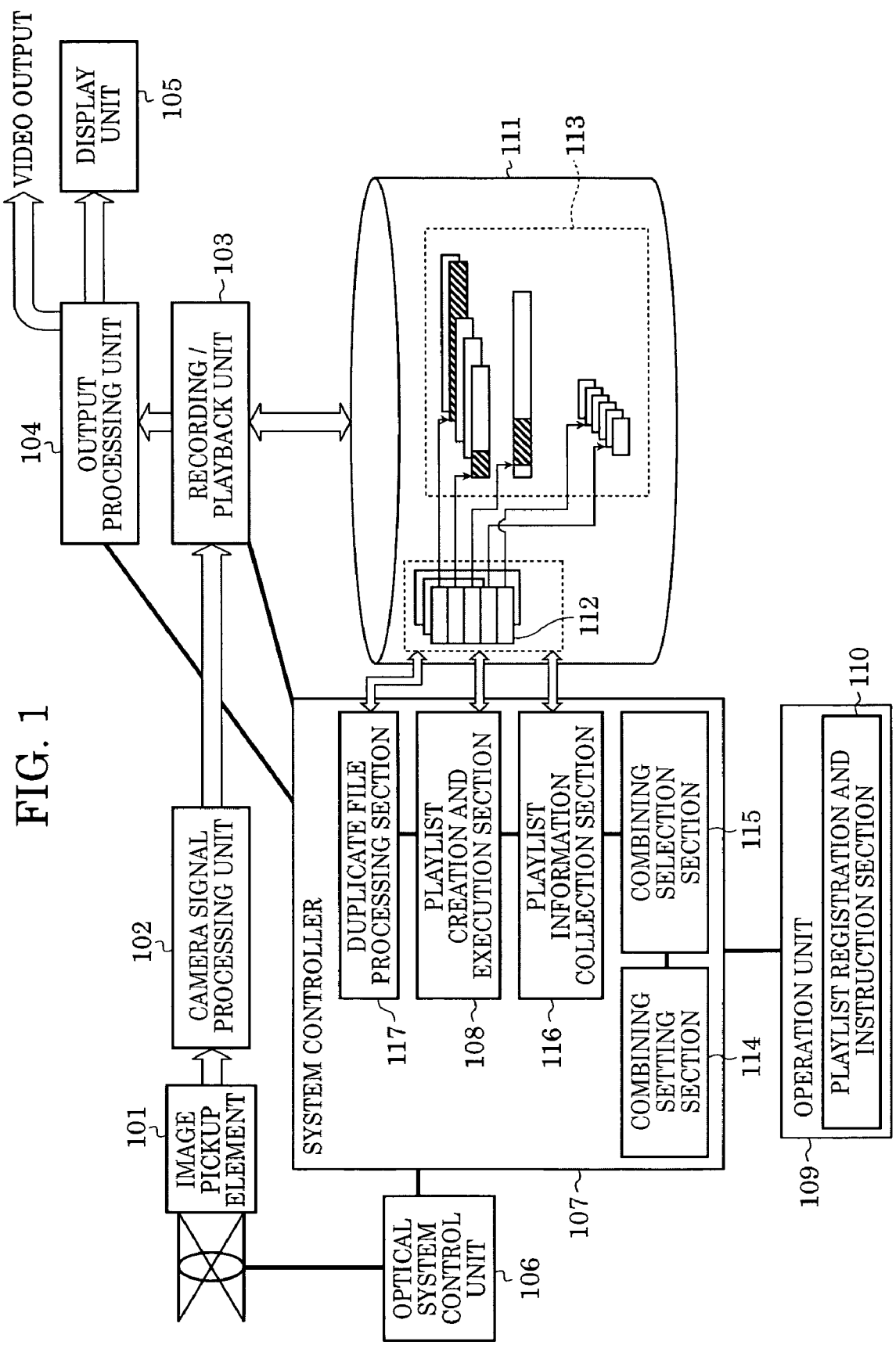
FIG. 1 is a block diagram showing the structure of an image recording/playback apparatus according to an embodiment of the present invention.

FIG. 1 is a block diagram schematically showing the structure of the image recording/playback apparatus according to the first embodiment.

Referring to FIG. 1, an image pickup element 101 converts an image that is incident on a lens into an electronic signal and outputs digital image pickup data. A camera signal processing unit 102 performs signal processing, such as brightness processing, color processing, and white balance control, on the digital image pickup data output from the image pickup element 101, and outputs image data. A recording/playback unit 103 writes the image data output from the camera signal processing unit 102 to a recording medium 111 and reads the image data from the recording medium 111.

An output processing unit 104 converts the image data output from the camera signal processing unit 102 when the image is photographed and the image data read from the recording medium 111 by the recording/playback unit 103 into an external output signal (video signal) to be output or into display data displayable on a display unit 105 to be output. The display unit 105 is, for example, a view finder or a liquid crystal panel, and is used for checking a photographed image, displaying a playback image, and displaying a setting menu. An optical system control unit 106 performs control, such as focusing and diaphragm adjustment, on an optical system, including a lens and a diaphragm, installed in front of an image pickup face of the image pickup element 101.

A system controller 107 performs control for condition management and execution processing of each processing unit. The system controller 107 includes a playlist creation and execution section 108, a combining setting section 114, a combining selection section 115, a playlist information collection section 116, and a duplicate file processing section 117. The functions of these sections are realized by a microcomputer contained in the system controller 107.

The playlist creation and execution section 108 performs interpretation when a playlist is being created and played back, and designates a file to be played back by the recording/playback unit 103. The combining setting section 114 displays a screen used by a user to set a rule when playlists are combined, and stores the settings. The combining selection section 115 displays a playlist selection screen including created playlists so that playlists to be combined can be selected, and stores the selected playlists. The playlist information collection section 116 collects information relating to the combining rule set by the combining setting section 114 from the playlists selected by the combining selection section 115. The duplicate file processing section 117 performs deletion of registration or registration for repeated playback for files duplicated as a result of the playlist combining.

The playlist creation and execution section 108 creates a normal playlist representing a playback procedure for playing back files selected by the user in a designated order. The playlist creation and execution section 108 also combines the playlists selected by the combining selection section 115 to create a new playlist.

An operation unit 109 includes a unit button and switch for giving a user an instruction to execute or stop processing, such as to start or end photographing, to the image recording/playback apparatus and a remote controller capable of remote controlling playback or stopping. Also, the operation unit 109 includes a playlist registration and instruction section 110.

Accordingly, when creating a playlist via the playlist creation and execution section 108, the user checks a recorded image on the display unit 105, and at the same time, sets marks and scenes in a moving image or sets marks in a still image to determine a playback order and a shot length via an operation area of the playlist registration and instruction section 110.

In the first embodiment, the recording medium 111 is a magnetic disk or an optical disk capable of random access. Image data (image file) 113 and a playlist 112 are recorded on the recording medium 111. Basic photographing information, such as photographing date and time, the F-number, the shutter speed, and the gain, is also recorded in the image data 113. Furthermore, image recording/playback apparatuses having a global positioning system (GPS) function or an Internet connection function are capable of recording photographing position information or weather information by utilizing those functions.

A playlist combining process performed by the image recording/playback apparatus shown in FIG. 1 is described next.

Figure 2:
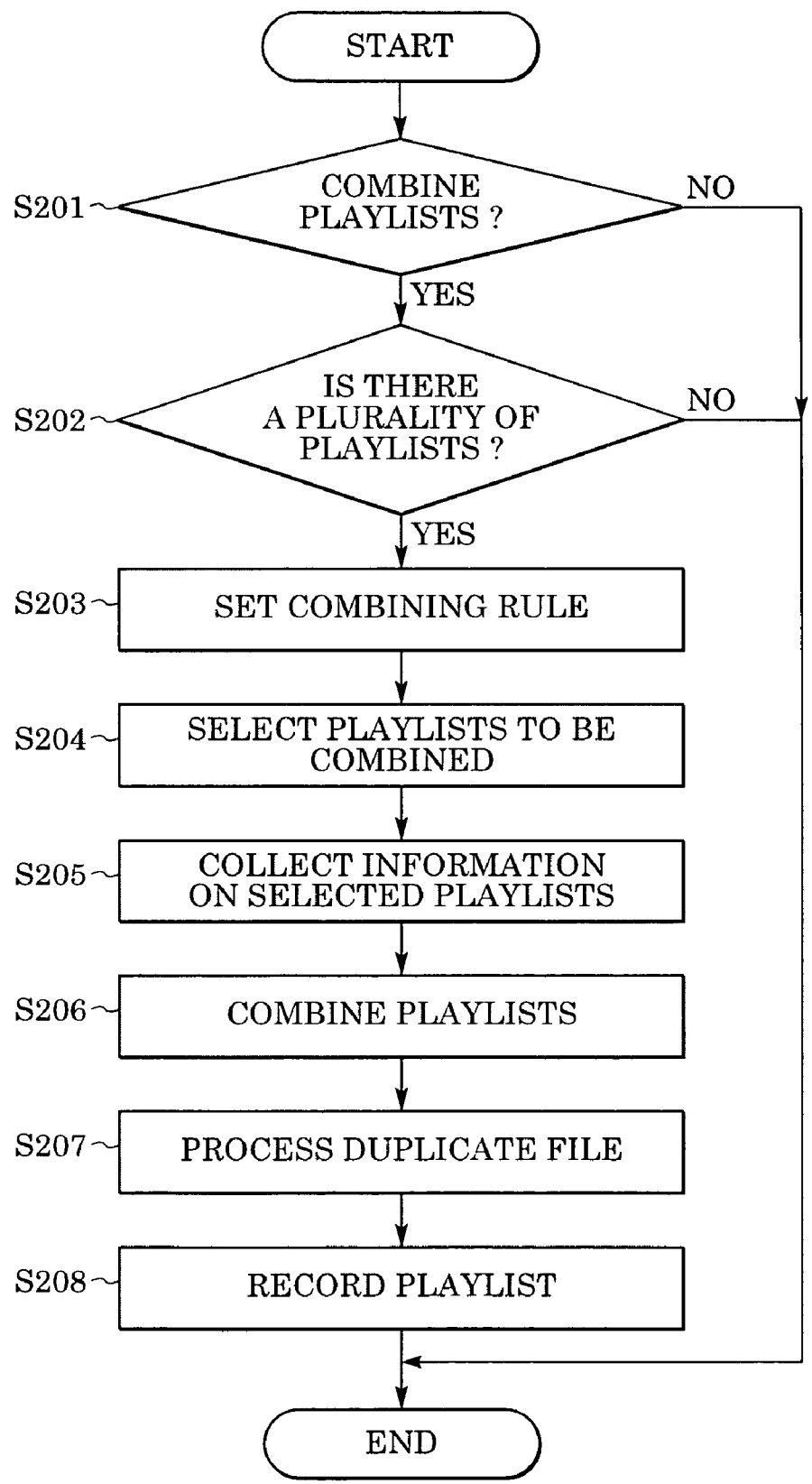
FIG. 2 is a flowchart of a playlist combining process.

FIG. 2 is a flowchart showing the playlist combining process performed by the image recording/playback apparatus shown in FIG. 1.

Referring to FIG. 2, in step S201, the image recording/playback apparatus determines whether or not to perform playlist combining. If it is determined not to perform the playlist combining, the image recording/playback apparatus ends the process without performing the playlist combining. If it is determined to perform the playlist combining, the process proceeds to step S202 to determine whether or not a plurality of created playlists exists.

Figure 3:
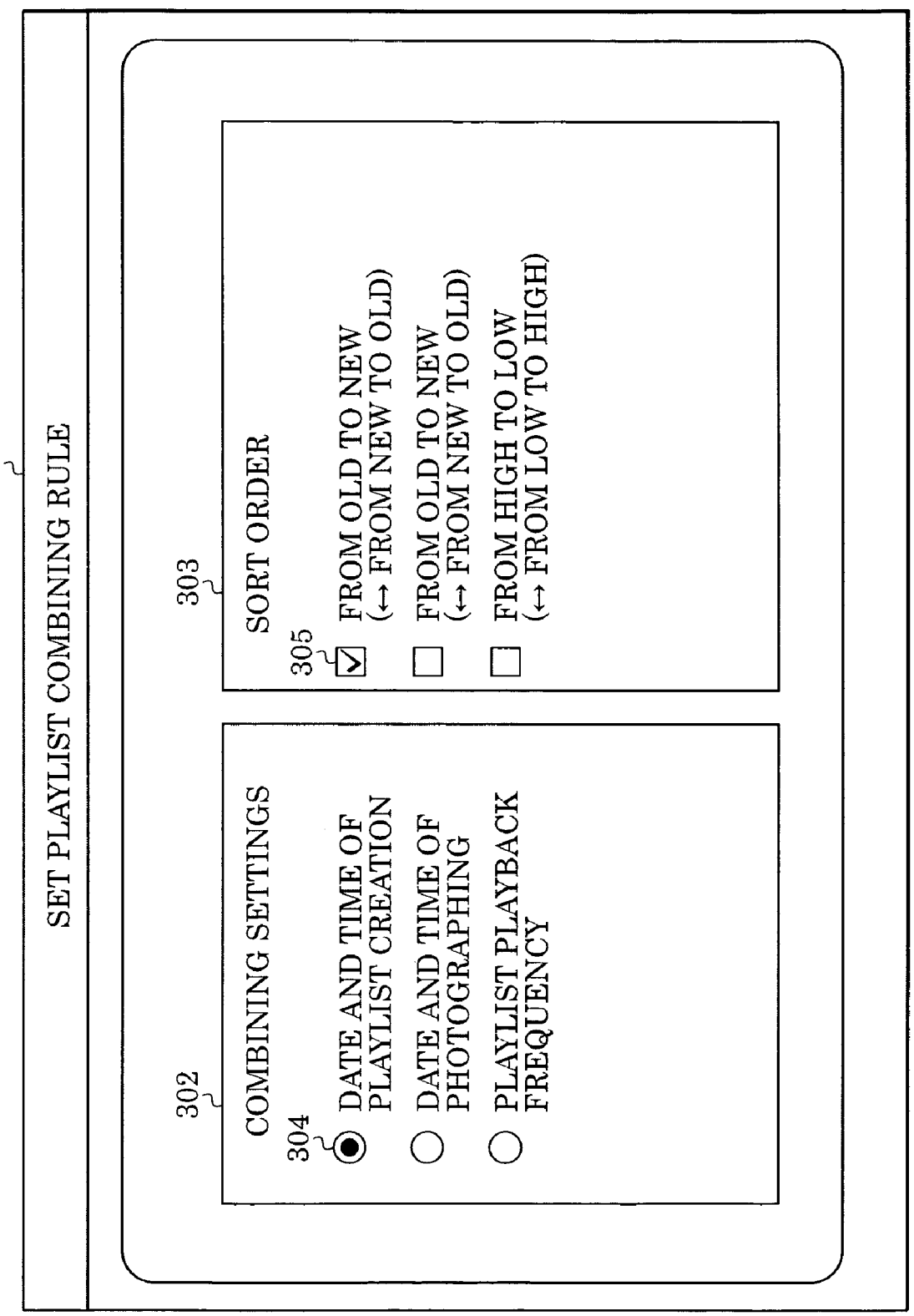
FIG. 3 illustrates a combining rule setting screen in the playlist combining process.

If it is determined that only one playlist exists in step S202, the process ends. If it is determined that a plurality of playlists exits in step S202, the combining setting section 114 sets a rule for the playlist combining in step S203. More specifically, displaying a combining rule setting screen 301 shown in FIG. 3 on the display unit 105 urges a user to set a combining rule. FIG. 3 illustrates an example of a screen for setting a combining rule in the playlist combining process according to the first embodiment.

Referring to FIG. 3, the combining rule setting screen 301 includes a combining setting item area 302 for selecting an item for combining setting and a sort order area 303 for selecting an item for performing sorting on the combining setting item selected in the combining setting item area 302. In the combining setting item area 302, one of "date and time of playlist creation", "date and time of photographing", and "playlist playback frequency" is selected using a button 304. In the sort order area 303, as the type of sorting, "from old to new" (in order from the oldest date and time to the newest date and time) or "from high to low" (in order from the highest frequency to the lowest frequency) are designated using a checkbox 305.

Although, in the first embodiment, setting of a combining rule is selected, as shown in FIG. 3, the present invention is not limited to this. In order to perform more advanced combining, a combining rule may be set by a combination of an identifier and a logical operator, instead of selecting a rule. In the first embodiment, the order from the oldest playlist creation date and time to the newest playlist creation date and time is set as a combining rule, as shown in FIG. 3.

In step S204, the combining selection section 115 performs selection of playlists to be combined. More specifically, a playlist selection screen 401 shown in FIG. 4 is displayed on the display unit 105 to urge the user to select playlists to be combined. FIG. 4 illustrates an example of a screen for selecting playlists according to the first embodiment. In the playlist selection screen 401 shown in FIG. 4, created playlists are displayed in a playlist selection area 403. Each of the playlists shown in the playlist selection area 403 is provided with a selection option 404, such as a checkbox, to make a selection between objects to be combined and objects not to be combined. The user selects a playlist by checking the selection option 404. Playlists selected by checking the selection option 404 are displayed in a combining list area 402.

In step S205, the playlist information collection section 116 collects information on the selected playlists in accordance with the set combining rule. Here, since the combining rule of the order from the oldest playlist creation date and time to the newest playlist creation date and time is set in step S203, the playlist information collection section 116 collects the creation dates and times of the playlists selected in step S204 as information.

In step S206, the playlist creation and execution section 108 combines the playlists in accordance with the information collected by the playlist information collection section 116. More specifically, the playlist creation and execution section 108 sorts the playlists selected by the step S204 in accordance with the order from the oldest playlist creation date and time to the newest playlist creation date and time, and then creates a new playlist in which a playback procedure to play back image files contained in each of the playlists in order is described.

In step S207, the duplicate file processing section 117 performs processing for duplicate files. More specifically, the duplicate file processing section 117 deletes image files, from among image files designated in a duplicate fashion, other than an image file to be played back for the first time, so that a file, from among the image files designated in the selected plurality of playlists, is not played back in a duplicate fashion. In step S208, the recording/playback unit 103 records the playlist created by steps S206 and S207 on the recording medium 111. Then, the process ends.

As described above, by performing the playlist combining process, the image recording/playback apparatus according to the first embodiment is capable of creating a new playlist in order from the oldest playlist creation date and time to the newest playlist creation date and time from selected playlists without including a duplicate file. In other words, the image recording/playback apparatus according to the first embodiment is capable of creating a playlist by collecting information on a plurality of playlists in accordance with a combining rule set by a user and by combining the playlists, that is, reconstructing a playlist including a playback order of files contained in the playlist in accordance with the collected information.

First Modification of First Embodiment

A case where the order from the oldest photographing date and time to the newest photographing date and time of image files designated in each playlist is set as a combining rule in step S203 in FIG. 2 is described next. Here, since only the processing in steps S205 and S206 is different from the first embodiment described above, only steps S205 and S206 will be explained.

In step S205, the playlist information collection section 116 collects information indicating the photographing date and time of each image file of each playlist selected in step S204. In step S206, the playlist creation and execution section 108 sorts all the image files designated in the selected playlists in order from the oldest photographing date and time to the newest photographing date and time, and creates a new playlist (a combined playlist) in which a playback procedure to play back the image files in order from the oldest photographing date and time to the newest photographing date and time is described.

With this processing, a playlist to play back all the image files contained in selected playlists in order of photographing date and time can be readily created.

Second Modification of First Embodiment

A case where the order from the highest playlist playback frequency to the lowest playlist playback frequency is set as a combining rule in step S203 in FIG. 2 is described next. Since only the processing in steps S205 and S206 are different from the first embodiment described above, only steps S205 and S206 will be explained. Here, a function (recording means) to record the number of playlist playback times in each piece of playlist information or in a particular region is provided.

In step S205, the playlist information collection section 116 collects information indicating the playback frequency of each of playlists selected in step S204. In step S206, the playlist creation and execution section 108 sorts the playlists in order from the highest playback frequency to the lowest playback frequency, and then creates a new playlist in which a playback procedure to play back image files contained in each of the playlists in order is described.

With this processing, a new playlist to play back image files in order of the playback frequency of selected playlists can be created.

Third Modification of First Embodiment

In the image recording/playback apparatus according to the first embodiment, in many cases, compressed image data is recorded. In such cases, a user can set a desired compression ratio.

In general, the compression ratio decreases in accordance with an increase in the importance of an image, and the compression ratio is likely to be in relation to the importance of an image. A case where the order from the lowest file compression ratio to the highest file compression ratio in playlists is set as a combining rule in step S203 in FIG. 2 is described next. Also, since only the processing in steps S205 and S206 is different from the first embodiment described above, only steps S205 and S206 will be explained.

In step S205, the playlist information collection section 116 collects information indicating the compression ratio of all the files designated in playlists selected in step S204. In step S206, the playlist creation and execution section 108 sorts all the image files designated in the selected playlists in order from the lowest compression ratio to the highest compression ratio, and then creates a new playlist in which a playback procedure to play back the image files in order from the lowest compression ratio to the highest compression ratio is described.

Files having the same compression ratio may be played back in order of the registration of the playlists. Alternatively, for files having the same compression ratio, setting performed in the second modification may be used, together with the order of the registration of the playlists. Accordingly, a new playlist combined from the selected playlists in order of the compression ratio (it is likely to be set in order of the importance) can be created.

Fourth Modification of First Embodiment

Although image files other than an image file to be played back for the first time are deleted from a combined playlist when the same image files exist in a plurality of playlists in step S207 in FIG. 2, a case where, when the same files are designated in a duplicate fashion after a plurality of playlists is combined, the same files are played back is described next. Here, since only the processing in step S207 is different from the first embodiment described above, only step S207 will be explained.

In step S207, the duplicate file processing section 117 determines a playback procedure for duplicate files contained in the combined playlist, such that, for a still image, the playback time per still image for playlist playback is extended according to the amount of duplication, and for a moving image, a shot of each duplication part (for example, a unit of a video change, such as a scene) is repeated.

With this processing, a new combined playlist that reflects the number of duplicate files can be created from playlists in order of playlist creation date and time.

Second Embodiment

As a second embodiment of the present invention, a case where playlists are combined in accordance with a play time designated (limited) by a user is described next. Since the schematic structure of an image recording/playback apparatus according to the second embodiment is similar to that of the image recording/playback apparatus according to the first embodiment shown in FIG. 1, explanations for the schematic structure of the image recording/playback apparatus according to the second embodiment are omitted.

A playlist combining process performed by the image recording/playback apparatus according to the second embodiment is described next.

Figure 5:
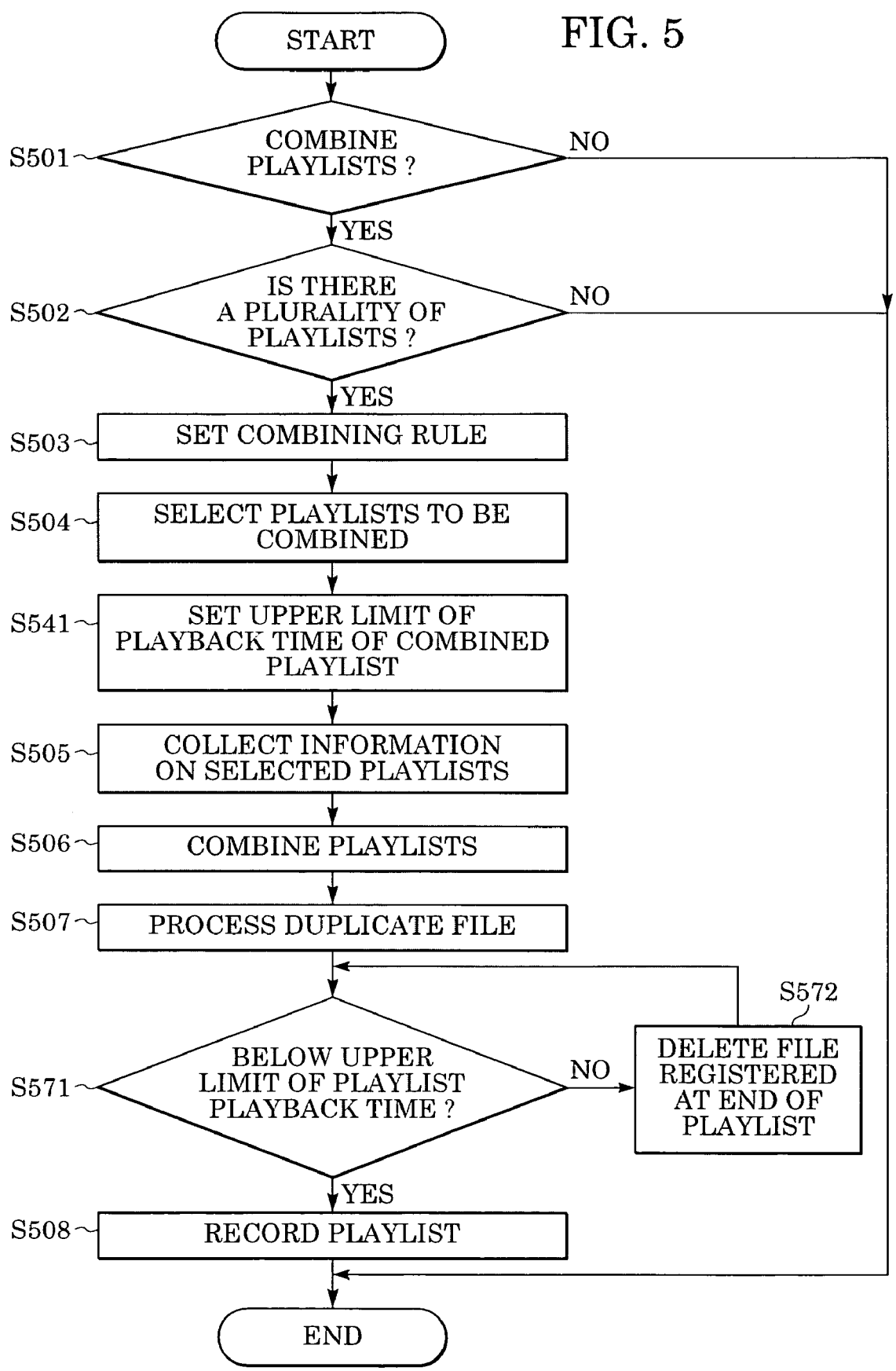
FIG. 5 is a flowchart of another playlist combining process.

FIG. 5 is a flowchart showing the playlist combining process performed by the image recording/playback apparatus according to the second embodiment. Since processing in steps S501 to S507 in FIG. 5 is the same as the processing in steps S201 to S207, respectively, according to the first embodiment shown in FIG. 2, explanations for the processing in steps S501 to S507 are omitted.

After step S504, the combining setting section 114 sets the play time of a combined playlist in step S541. Here, the combining setting section 114 is capable of displaying the sum obtained by simply adding the play times of selected playlists as a reference value in step S504. When the user wants to limit the sum of the play times of the selected playlists, the user sets an upper limit of the play time of the combined playlist.

Then, the processing in steps S505 to S507 is performed as in the processing in steps S205 to S207, respectively, in FIG. 2.

Then, in step S571, the playlist creation and execution section 108 determines whether or not the play time of the combined playlist exceeds the upper limit set in step S541. If it is determined that the play time does not exceed the upper limit in step S571, the recording/playback unit 103 records the playlist created in steps S506 and S507 on the recording medium 111 in step S508. Then, the process ends. If it is determined that the play time exceeds the upper limit in step S571, the process proceeds to step S572 to delete a file registered at the end of the playlist. Then, the process returns to step S571.

In other words, the playlist creation and execution section 108 repeats the processing in step S572 until the play time does not exceed the upper limit.

As described above, the image recording/playback apparatus according to the second embodiment is capable of creating a new playlist from playlists selected to be combined such that the play time of the combined playlist is within a play time designated (limited) by a user.

Although, in the processing of creating a new playlist described in each of the foregoing embodiments, processing for combining playlists based on a combining rule (step S206 or S506), processing for duplicate files (step S207 or S507), and processing for an upper limit for the playback time (steps S571 and S572) are performed in that order, each step is not necessarily performed after completing the previous step. Each step may be performed in the most suitable way in accordance with a well-known sorting and retrieval algorithm adopted for playlist combining. Also, since the amount of information may differ depending on the functionality provided in the image recording/playback apparatus, items set as combining rules are not necessarily limited to the items mentioned in each of the foregoing embodiments.

As described above, the image recording/playback apparatus according to each of the foregoing embodiments is capable of creating a new playlist using files contained in a plurality of playlists by combining the playlists in accordance with user settings. Thus, the user does not need to designate image files again that have already been designated in the plurality of playlists in order to create a playlist.

Also, information about a plurality of playlists is collected in accordance with a rule set by the user so that playlists can be combined, that is, a playlist can be reconstructed including the playback order of files contained in the combined playlist. Thus, creation of a playlist can be effectively supported.

In the first embodiment, after a user sets a combining rule, a plurality of playlists is selected in accordance with the set combining rule. However, a plurality of playlists may be selected in accordance with an order in which the user wants to play back the playlists, so that a new playlist for playing back image files contained in each of the playlists in the selected playlist order can be created.

In this case, the user does not need to set a combining rule. The user merely needs to designate playlists in an order in which the user wants to play back the playlists. The system controller 107 automatically combines the designated playlists to make a new playlist. Thus, the user does not need to spend time and effort to designate image files again that have already been designated in the plurality of playlists to make a new playlist.

A processing function of each block of the system controller 107 of the image recording/playback apparatus according to each of the foregoing embodiments can be realized by causing a central processing unit (CPU) to read a program for realizing the processing function from a memory and to perform the program. Alternatively, all or part of the processing can be realized by dedicated hardware.

Also, the above-mentioned memory can be a magnetic optical disk device, a non-volatile memory, such as a flash memory, a read-only recording medium, such as a compact disk read-only memory (CD-ROM), or a volatile memory other than a random-access memory (RAM). Alternatively, the above-mentioned memory can be a computer-readable and writable recording medium combining the device, the recording medium, and the memories described above.

Also, the processing can be performed by recording a program for realizing the functions to perform the processing in the system controller 107 of the above-described image recording/playback apparatus on a computer-readable recording medium and by causing a computer system to read the program recorded on the recording medium and to perform the program. The computer system includes hardware, such as an operating system (OS) and a peripheral apparatus.

Also, the above-mentioned program can be transmitted from the computer system including a storage device in which the program is stored to a computer system via a transmission medium or transmission waves in the transmission medium. The transmission medium for transmitting the program is a medium having a function to transmit information, such as a network, including the Internet, or a communication line, including a telephone line.

Also, the above-mentioned program can realize part of the above-mentioned functions. Furthermore, the above-mentioned program can realize the above-mentioned functions by combining the above-mentioned program with a program that has already been recorded in the computer system. In other words, the above-mentioned program can be a differential file (or differential program).

Also, a software product, such as a computer-readable recording medium on which the above-mentioned program is recorded, can also be an embodiment of the present invention.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-000895 filed Jan. 6, 2004, which is hereby incorporated by reference herein.

What is claimed is:

1. An image processing apparatus comprising:
   a playback unit configured to play back image data and a plurality of pieces of playlists from a recording medium, each of the plurality of pieces of playlists representing a playback order of the image data;
   a changing unit configured to change the playback order of the plurality of pieces of playlists; and
   a playlist processing unit configured to generate a combined playlist representing the playback order of the plurality of image data each designated in the plurality of pieces of playlists in accordance with the playback order of the plurality of pieces of playlists changed by the changing unit,
   wherein the combined playlist represents the playback order of the plurality of image data so as to play back the plurality of image data each designated in the plurality of pieces of playlists in accordance with the playback order of the plurality of pieces of playlists changed by the changing unit,
   wherein the combined playlist represents the playback order of the plurality of image data so as to play back the plurality of image data each designated in the plurality of pieces of playlists in the orders each designated in the plurality of pieces of playlists; and
   wherein the playlist processing unit determines the playback order of the plurality of image data represented by the combined playlists such that duplicate image data from among the plurality of image data each designated in the plurality of pieces of playlists is inhibited from being played back in a duplicate fashion.

2. The image processing apparatus according to claim 1, further comprising a setting unit configured to set a condition, wherein
   the changing unit changes the playback order of the plurality of pieces of playlists in accordance with the condition set by the setting unit.

3. The image processing apparatus according to claim 2, wherein the changing unit changes the playback order of the plurality of pieces of playlists using additional information of the playlist.

4. The image processing apparatus according to claim 2, wherein the condition includes a generation date of the playlist.

5. The image processing apparatus according to claim 1, further comprising a selection unit configured to select a plurality of pieces of playlists from the plurality of pieces of playlists recorded on the recording medium, wherein the changing unit changes the playback order of the plurality of pieces of playlists selected by the selection unit, and wherein the playlist processing unit generates the combined playlist representing the playback order of the plurality of image data each designated in the plurality of pieces of playlists selected by the selection unit.

6. The image processing apparatus according to claim 1, further comprising a recording unit configured to record the combined playlist generated by the playlist processing unit on the recording medium.

7. The image processing apparatus according to claim 6, further comprising:
a playlist selection unit configured to select one of the plurality of playlists including the combined playlist recorded on the recording medium; and
a control unit configured to control the playback unit to play back the image data from the recording medium in accordance with the playback order represented in the playlist selected by the playlist selection unit.

8. An image processing method comprising:
playing back image data and a plurality of pieces of playlists from a recording medium, each of the plurality of pieces of playlists representing a playback order of the image data;
changing the playback order of the plurality of pieces of playlists; and
generating a combined playlist representing the playback order of the plurality of image data each designated in the plurality of pieces of playlists by combining the plurality of pieces of playlists in accordance with the playback order of the plurality of pieces of playlists changed,
wherein the combined playlist represents the playback order of the plurality of image data so as to play back the plurality of image data each designated in the plurality of pieces of playlists in accordance with the playback order of the plurality of pieces of playlists changed, and
wherein the combined playlist represents the playback order of the plurality of image data so as to play back the plurality of image data each designated in the plurality of pieces of playlists in the orders each designated in the plurality of pieces of playlists,
wherein the playback order of the plurality of image data represented by the combined playlists is determined such that duplicate image data from among the plurality of image data each designated in the plurality of pieces of playlists is inhibited from being played back in a duplicate fashion.

* * * * *